(No Model.)

H. COMSTOCK.
PIPE BURR REMOVING IMPLEMENT.

No. 499,098. Patented June 6, 1893.

Witnesses.
Robert Everitt
J. A. Rutherford

Inventor.
Harry Comstock
By James L. Norris
Atty.

UNITED STATES PATENT OFFICE.

HARRY COMSTOCK, OF FULTON, NEW YORK.

PIPE-BURR-REMOVING IMPLEMENT.

SPECIFICATION forming part of Letters Patent No. 499,098, dated June 6, 1893.

Application filed September 17, 1892. Serial No. 446,185. (No model.)

*To all whom it may concern:*

Be it known that I, HARRY COMSTOCK, a citizen of the United States, residing at Fulton, in the county of Oswego and State of New York, have invented new and useful Improvements in Pipe-Burr-Removing Implements, of which the following is a specification.

The object of my invention is to provide a simple, convenient, and efficient implement for quickly and neatly removing or cleaning out the burr formed on the interior of the aperture of a metal pipe by the action of the usual pipe-cutters. The removal of such burrs is often the source of considerable trouble and annoyance owing to the want of a burr-removing tool adapted to the varying requirements of pipes of different diameters.

The object of my invention is accomplished by the features of construction and the combination or arrangement of parts hereinafter described and claimed, reference being made to the accompanying drawings, in which—

Figure 1:
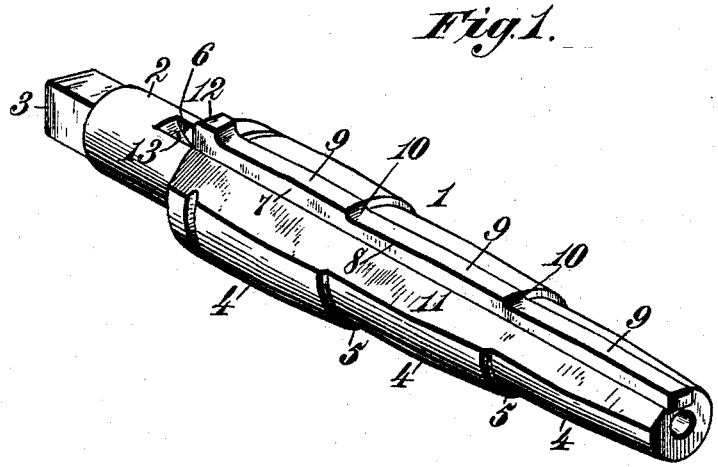
Figure 2:
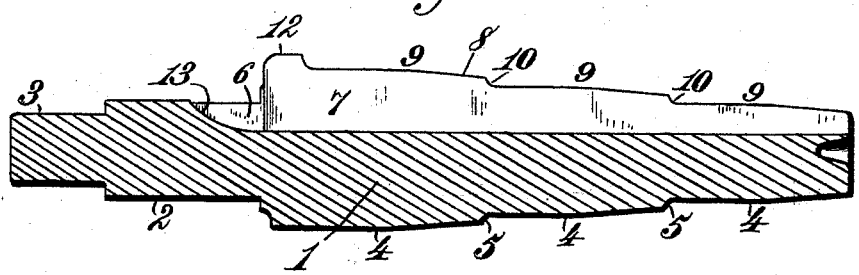
Figure 3:
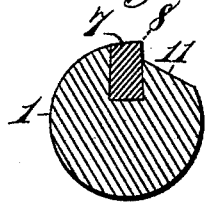

Figure 1 is a view of my pipe-burr removing implement. Fig. 2, is a longitudinal section of the same. Fig. 3, is a transverse section of the implement.

Referring, to the drawings the numeral 1 designates the body of the implement which may be formed with a cylindrical shank 2, having a squared end 3, for attachment of a suitable wrench or handle to be used in rotating the implement when applied to the purpose for which it is designed.

The main portion of the body of the implement has a generally tapering or conoidal shape and is provided with a series of stepped portions 4 that are formed by circumferential shoulders 5, which are plain and smooth and are arranged at suitable intervals.

In one side of the stepped body of the implement is formed a longitudinal groove 6 to receive an insertible and removable cutting bar 7, which is formed with a cutting edge 8, and provided with stepped portions 9 and shoulders 10, corresponding and registering with the stepped and shouldered portions of the body.

Adjacent to the cutting edge of the bar 7 the body of the implement is cut away, as shown at 11, to afford a suitable clearance for the said cutting edge. The rear end of the cutting bar 7 may be provided with a lug 12 and the rear end of the longitudinal groove 6 may be extended into the shank 2 and formed therein with a quick incline 13, to facilitate insertion and removal of said bar.

The stepped portions of the tool body and cutting bar are each preferably made somewhat bulging at the center to facilitate a proper bearing of the implement within the end of a pipe from which a burr is to be removed by rotating said implement therein.

By providing the implement with a series of stepped portions, and plain, smooth shoulders, as described, and constructing the cutting bar with corresponding steps and shoulders, whereby the diameter of the working portion of the tool is varied at different points, it will readily meet the requirements of several different sizes of pipes. The stepped portions of the implement can be graduated in any desired ratio to suit the trade.

The manner of employing the tool for the removal of burrs from the apertures of the cut ends of metal pipes will be readily understood from the foregoing description and need not be further explained, but it is proper to state that the circumferential shoulders 5 and 10 are plain and smooth and merely serve as stops which bear against the ends of the pipes and limit the insertion of the implement thereinto.

What I claim as my invention is—

1. An implement for removing burrs from the interior of a pipe, consisting of a body provided with a longitudinal cutting edge 8, a longitudinal clearance space 11 and a series of stepped portions separated from each other by plain, smooth, circumferential stop shoulders which serve to bear against the end of a pipe to limit the insertion of the implement thereinto, substantially as described.

2. A pipe-burr removing implement, consisting of a longitudinally grooved body provided with a series of stepped portions having different diameters and a series of circumferential shoulders and a removable cutting bar inserted in the longitudinally grooved portion of said body and having different elevations and shoulders registering with the stepped and shouldered portions of said tool body, substantially as described.

In testimony whereof I have hereunto set my hand and affixed my seal in presence of two subscribing witnesses.

HARRY COMSTOCK. [L. S.]

Witnesses:
F. G. SPENCER,
CHAS. F. BOYD.